Nov. 23, 1948.    F. S. BRACKETT    2,454,268
PERISCOPE MOUNTING FOR ARMORED VEHICLES
Filed April 11, 1945

INVENTOR.
FREDERICK S. BRACKETT
BY
ATTORNEYS

Patented Nov. 23, 1948

2,454,268

UNITED STATES PATENT OFFICE 2,454,268

PERISCOPE MOUNTING FOR ARMORED VEHICLES

Frederick S. Brackett, Chevy Chase, Md.

Application April 11, 1945, Serial No. 587,819

2 Claims. (Cl. 88—68)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to facilitating the use of periscopes from protected positions and it is particularly advantageous for use on military vehicles such as combat tanks as well as in similar installations, especially where convenience of operation and minimum spacial requirements are highly desirable.

For observation in azimuth, periscopes have been mounted for rotary motion about a substantially vertical axis usually extending substantially within the periscope or at least so close thereto that as the periscope was turned it became necessary for the observer to walk around it in order to be able to observe through it. It will be evident that in order to provide 360° of vision with such a periscope, there must be space for the observer to walk completely around it. This is not only inconvenient, but the circular path for the observer to follow around the periscope requires space which otherwise could be used to good advantage for other purposes.

The invention provides for improving installations of the class described so as considerably to reduce the spacial requirements for an observer while using a periscope at different positions in azimuth as well as to facilitate the use of the periscope by an observer and thereby, to overcome disadvantages of the kind hereinabove mentioned.

In accordance with this invention, these desirable objectives may be attained by mounting a periscope for bodily movement in azimuth in an orbit at a sufficient radius from the observer so that the latter may remain substantially at the axis of the orbital movement of the periscope and yet have 360° of vision in azimuth merely by turning his head and, if need be, his body also, in order to follow the periscope as it travels about him in azimuth.

The features of the invention are illustrated in the accompanying drawings, wherein.

Figure 1:
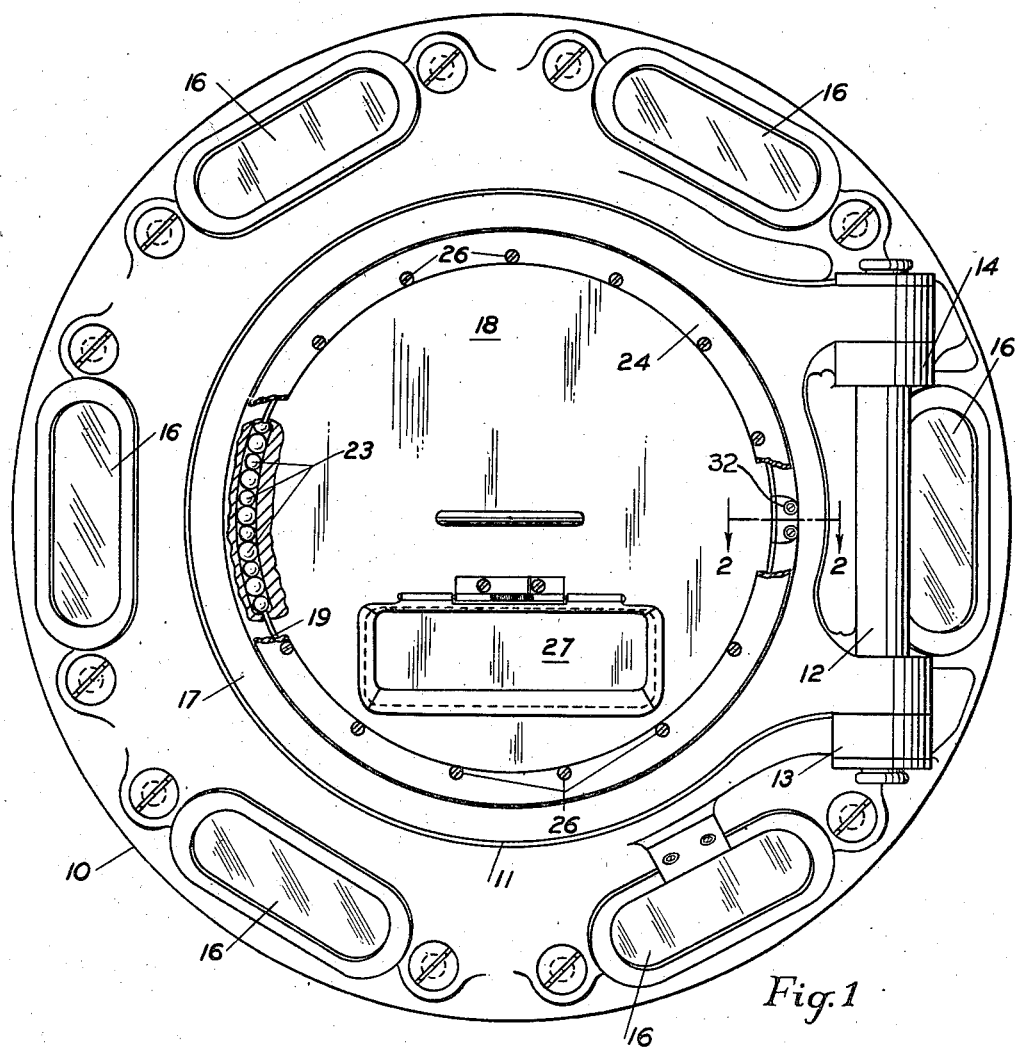
Fig. 1 is a top plan view of the turret of a combat tank.
Figure 2:
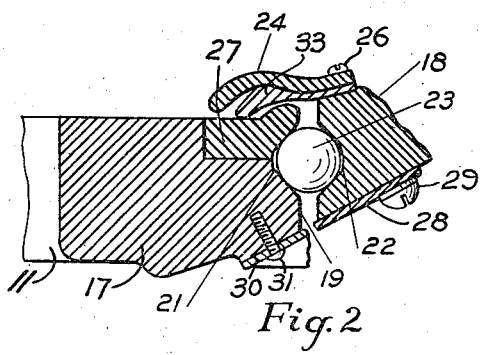
Fig. 2 is a section on the line 2—2 of Fig. 1.

In the embodiment selected for illustration herein by way of example, there is shown a turret 10, which may be the turret of a combat tank or of a similar installation. This turret may be equipped with a hatch cover 11 mounted to swing on a hinge pin 12 which may be supported in brackets 13 and 14, as is well understood in this art. If desired, the turret may also be provided with a suitable number of light transmitting windows 16.

Preferably, the hatch cover is formed in at least two parts comprising an outer or peripheral ring portion 17 and a central, relatively rotatable periscope supporting portion 18. This central periscope supporting portion may be, and preferably is, circular in contour and is adapted to be received in a substantially complementary circuelar opening 19 in ring portion 17 of hatch cover 11. In order that ring portion 17 and central portion 18 may be relatively rotatable their juxtaposed edge portions may be shaped, as indicated at 21 and 22 respectively, to form a raceway for anti-friction bearings, such as ball bearings 23 the outer portion of the raceway being formed of the inner edge of ring portion 17 and the inner edge of a part 27 secured by screws 32 to ring portion 17, part 27 providing access for ball bearings 23. For protecting this raceway, a circular flange 24 may be arranged to extend above it and the adjoining marginal edge of ring portion 17. This flange may be secured to central portion 18 in any suitable manner, as by means of attaching elements, such as screws 26.

In accordance with this invention, it is contemplated that an observer's station may be located substantially directly beneath the center, or the rotary axis of central portion 18 of the hatch cover. In order that an observer at a station so selected may have a complete range of vision in azimuth with the greatest convenience and minimum spacial requirements, a periscope 27 may be mounted on central portion 18 of the hatch cover at a sufficient distance or radius from the center or rotary axis of central portion 18 to permit the periscope to travel in an orbit about the observer as rotary motion is imparted to central portion 18. This periscope may be of any well known or suitable type and may be, and preferably is, adjustable vertically through the hatch cover as is well known in this art.

It will be understood that rotary motion may be imparted to central portion 18 in any suitable manner, as manually by the observer who may grasp the portion of the periscope beneath the hatch cover and move it about him to desired positions in azimuth. This makes it possible for the observer to remain in one central position or station and, at the most, merely to turn his body in order to observe through the periscope at different positions in azimuth. It will also be seen that this construction and relative arrangement eliminates the need for the free space formerly required about the periscope to permit the observer to walk around it during rotary movement for azimuth adjustments thereof. It will be apparent from this disclosure that the space so made available may well be utilized for other purposes.

What I claim is:

1. In an armored vehicle of the type having therein a hatch opening above an observer's station for periscopic observation, the combination with a hatch cover for closing said hatch opening, said hatch cover comprising a hinged annular ring outer cover portion having a central circular aperture therein and a single periscope-supporting circular inner cover portion closing said aperture and rotatably mounted therein about its vertical axis, of a vertical opening in said circular cover portion disposed eccentrically of said vertical axis for mountedly receiving a single periscope, and a single periscope extending vertically upward through and mountedly supported at said vertical opening, whereby an observer may, while merely turning his body and otherwise remaining at said station, observe throughout 360 degrees of azimuth by rotating said circular inner cover portion.

2. In an armored vehicle of the type having therein a hatch opening closable by means of a hatch cover above an observer's station for periscopic observation, the improvement for periscopic observation comprising, in combination, an outer annular hatch cover portion for closing said hatch opening, said outer portion having a central circular vertical aperture therein, an inner circular hatch cover portion closing said aperture and rotatably mounted therein about its vertical axis, said inner portion having a vertical opening therein disposed eccentrically of said vertical axis, and a single mounted periscope extending vertically upward through said vertical opening, whereby an observer may, while merely turning his body and otherwise remaining at said station, observe through said periscope throughout 360 degrees of azimuth by rotating said inner portion.

FREDERICK S. BRACKETT.

REFERENCES CITED

The following references are of record in the file of this patent:

UNITED STATES PATENTS

| Number | Name | Date |
|---|---|---|
| 649,046 | Fiske | May 8, 1900 |
| 749,754 | Spear | Jan. 19, 1904 |
| 1,140,364 | De Cou | May 25, 1915 |
| 1,175,609 | Cottrell | May 14, 1916 |
| 1,456,679 | Roux | May 29, 1923 |
| 1,486,114 | Akeman | Mar. 11, 1924 |
| 1,708,746 | Von Hofe | Apr. 9, 1929 |
| 2,310,939 | Crawford | Feb. 16, 1943 |
| 2,335,286 | Kleinperer | Nov. 30, 1943 |
| 2,362,887 | Gorte | Nov. 14, 1944 |
| 2,395,310 | Wilson | Feb. 19, 1946 |
| 2,410,842 | Scholz | Nov. 12, 1946 |

FOREIGN PATENTS

| Number | Country | Date |
|---|---|---|
| 517,624 | Germany | Feb. 6, 1931 |